United States Patent

Kidokoro et al.

[11] Patent Number: 6,142,569
[45] Date of Patent: Nov. 7, 2000

[54] RECLINING DEVICE

[75] Inventors: Hideaki Kidokoro, Yokohama; Masaaki Nonomiya, Kamakura; Akira Sasaki, Yokohama, all of Japan

[73] Assignee: NHK Spring Co., Ltd,, Yokohama, Japan

[21] Appl. No.: 09/345,978

[22] Filed: Jul. 1, 1999

Related U.S. Application Data

[63] Continuation-in-part of application No. 09/021,002, Feb. 9, 1998, abandoned.

[30] Foreign Application Priority Data

Feb. 13, 1997 [JP] Japan .................................... 9-029132
Dec. 26, 1997 [JP] Japan .................................... 9-358862

[51] Int. Cl.$^7$ .................................................. B60N 2/22
[52] U.S. Cl. ........................................................ 297/366
[58] Field of Search ............................................ 297/367

[56] References Cited

U.S. PATENT DOCUMENTS

| | | | |
|---|---|---|---|
| 3,788,698 | 1/1974 | Perkins .................. | 297/367 X |
| 4,082,352 | 4/1978 | Bales et al. . | |
| 4,087,885 | 5/1978 | Gillentine . | |
| 4,103,970 | 8/1978 | Homier . | |
| 4,523,786 | 6/1985 | Letournoux et al. . | |
| 4,634,182 | 1/1987 | Tanaka . | |
| 4,659,146 | 4/1987 | Janiaud .................. | 297/367 |
| 4,770,464 | 9/1988 | Pipon et al. .......... | 297/367 |
| 4,789,205 | 12/1988 | Pipon et al. . | |
| 4,874,205 | 10/1989 | Arefinejad et al. . | |
| 5,622,408 | 4/1997 | Yamada et al. ....... | 297/367 |
| 5,632,525 | 5/1997 | Uramichi ............... | 297/367 |
| 5,664,836 | 9/1997 | Takagi .................. | 297/367 |
| 5,664,837 | 9/1997 | Takagi .................. | 297/367 |
| 5,678,895 | 10/1997 | Matsuura et al. ..... | 297/367 |

FOREIGN PATENT DOCUMENTS

| | | |
|---|---|---|
| 0232192 | 8/1987 | European Pat. Off. . |
| 0749865 | 12/1996 | European Pat. Off. . |
| 2530436 | 1/1984 | France . |
| 3-52965 | 8/1991 | Japan . |
| 2284987 | 6/1995 | United Kingdom . |

Primary Examiner—Peter M. Cuomo
Assistant Examiner—David E. Allred
Attorney, Agent, or Firm—Frishauf, Holtz, Goodman, Langer & Chick, P.C.

[57] ABSTRACT

A base plate is formed having a pair of guide projections projecting in the thickness direction thereof and an auxiliary projection situated between the guide projections. An internal gear is provided on the inner surface of an offset portion that is formed on a movable arm. An external gear on a latch member is in mesh with the internal gear. The guide projections and the auxiliary projection are fitted in the offset portion. The latch member is interposed between the first and second guide projections so as to be slidable in the vertical direction. The latch member can be moved to be disengaged from the internal gear by means of a cam member that rotates integrally with an operating lever. The auxiliary projection is inserted in a hole in the latch member and arranged on a line connecting the end portions of the guide projections.

1 Claim, 10 Drawing Sheets

RECLINING DEVICE

CROSS-REFERENCE TO RELATED APPLICATIONS

This is a Continuation-in-Part application of U.S. patent application Ser. No. 09/021,002, filed Feb. 9, 1998, now abandoned, the entire contents of which are incorporated herein by reference.

BACKGROUND OF THE INVENTION

The present invention relates to a reclining device adapted for variable setting of the tilt angle of a seat back of an automobile seat, for example.

There are various types of reclining devices. A hinge device described in Jpn. Pat. Appln. KOKOKU Publication No. 3-52965 is one such known device. In this device, an internal gear and a latch member are provided on a stationary plate and a movable plate, respectively, and a seat back is locked by causing the latch member to engage the internal gear. According to this prior art, an operating lever is pivotally mounted in a position separate from a shaft, the motion of the lever is transmitted to a cam by means of a link, and the latch member is actuated by means of the cam.

If the axis of rotation of the operating lever is deviated from the center of the shaft, as in the prior art device (Jpn. Pat. Appln. KOKOKU Publication No. 3-52965), the motion of the lever must inevitably be transmitted to the cam by means of an intermediate member such as the link. Therefore, the path of transmission of force from the operating lever to the latch member is subject to a substantial load loss or stroke loss.

Figure 13:
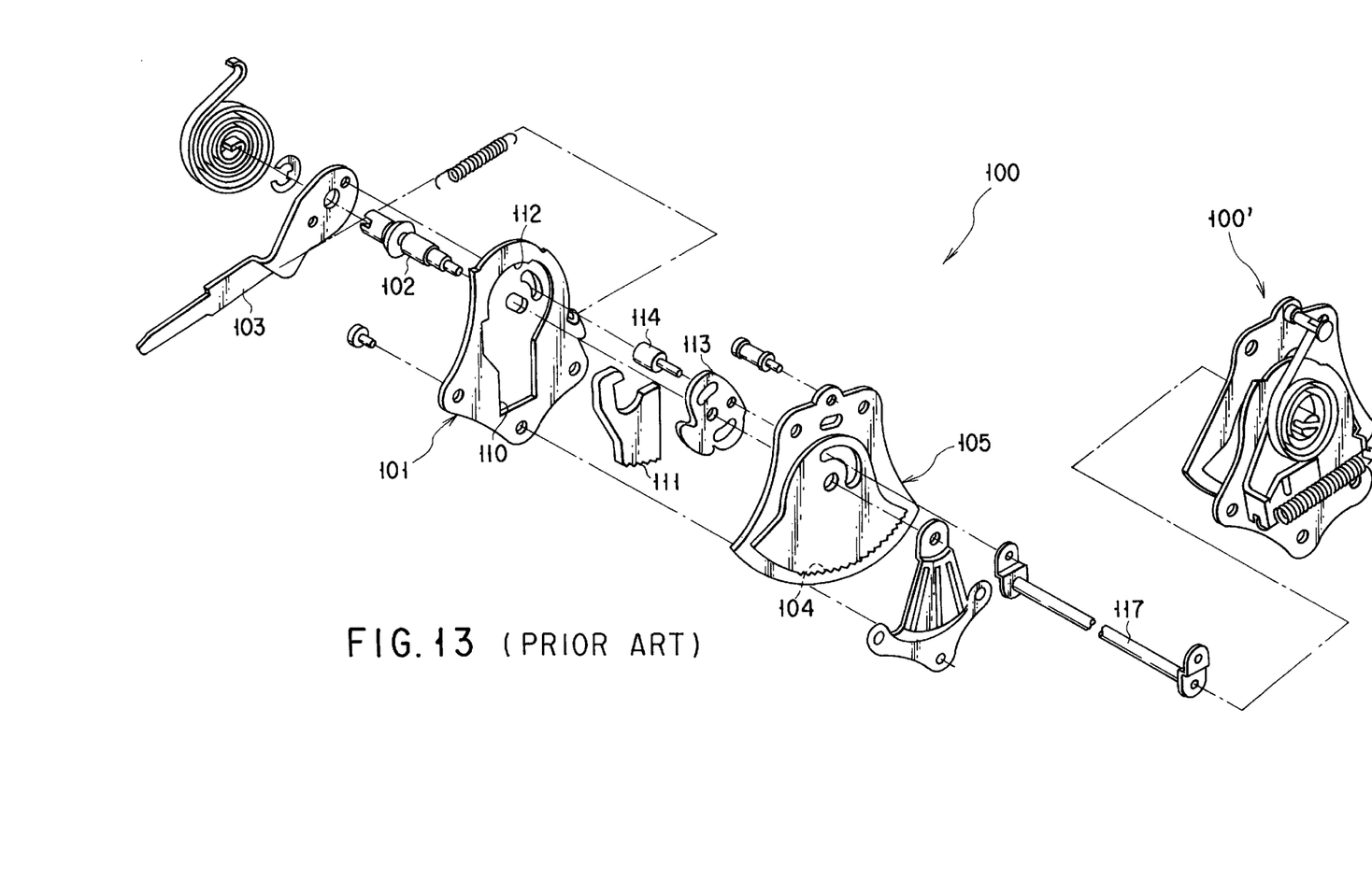
FIG. 13 is an exploded perspective view of a conventional internal-gear reclining device.

Accordingly, an internal-gear reclining device 100, such as the one shown in FIG. 13, has been proposed in order to enable the operating lever to transmit operating force thereon to the cam member without any loss. This device 100 comprises a base plate 101, an operating lever 103 rotatable around a shaft 102 fixed to the plate 101, and a movable arm 105 rotatably supported on the shaft 102 and having an internal gear 104. The device 100 further comprises a latch member 111, a cam member 113, a coupling member 114, etc. The latch member 111 is interposed between the base plate 101 and the movable arm 105, and is movable along a groove 110 in the plate 101. The cam member 113 is fitted in a recess 112 in the base plate 101, and is rotatable around the shaft 102. The coupling member 114 serves to transmit the rotary motion of the operating lever 103 to the cam member 113.

Figure 14:
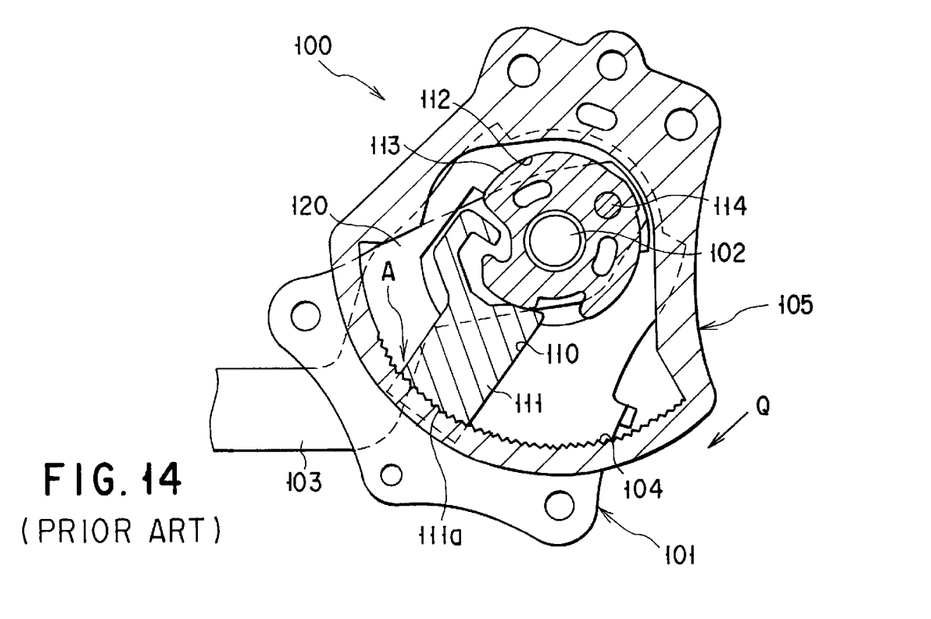
FIG. 14 is a front view, partially in section, showing the reclining device of FIG. 13.

In the reclining device 100, as shown in FIG. 14, a gear portion 111a of the latch member 111 is pressed against the internal gear 104 by the cam member 113 when the operating lever 103 is lowered. As the internal gear 104 engages the gear portion 111a, the movable arm 105 is fixed to the base plate 101, that is, the seat back is fixed (or locked). When the operating lever 103 is pulled up, it rotates around the shaft 102, and at the same time, the cam member 113 rotates around the shaft 102. Thereupon, the cam member 113 shifts its position so that the latch member 111 is disengaged from the internal gear 104. Thus, the movable arm 105 is released from the latch member 111 or unlocked so that it can rotate relatively to the base plate 101.

The reclining device 100 is provided on one side of a seat. In the case of a bilateral-locking recliner, a second reclining device 100' that resembles the reclining device 100 in construction is located on the other side of the seat. The paired reclining devices 100 and 100' are designed so that their respective cam members 113 (only one of which is shown) are linked together by means of a coupling rod 117.

Figure 15:
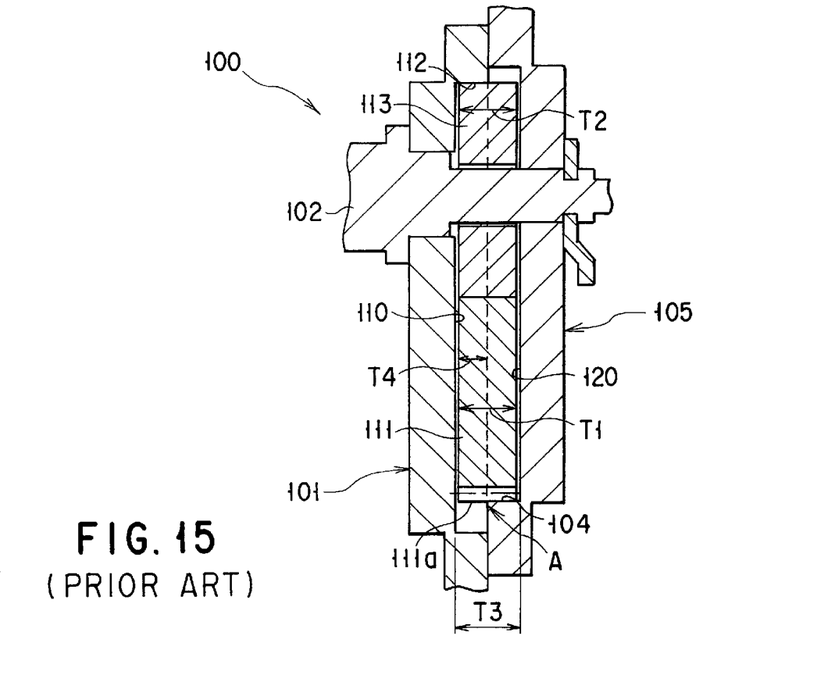
FIG. 15 is a partial vertical sectional view of the conventional reclining device shown in FIG. 13.

As shown in FIG. 15, the conventional internal-gear reclining device 100 is provided with an offset portion, which includes the groove 110 for holding the left-hand half of the latch member 111 and a recess 112 for holding the left-hand half of the cam member 113. The groove 110 and the recess 112 are obtained by stamping out parts of the base plate 101 to the left-hand side by pressing. On the other hand, a recess 120 for holding the respective right-hand halves of the members 111 and 113 are formed by stamping out part of the movable arm 105. The internal gear 104 is formed on an end of the recess 120. Since the latch member 111 is stamped out of its material by fine blanking, the gear portion 111a extends across the overall thickness of the latch member 111.

In the case where the latch member 111 and the cam member 113 are held between the base plate 101 and the movable arm 105, the thicknesses T1 and T2 of the members 111 and 113 must be approximated to a distance T3 between the respective inner surfaces of the groove 110 and the recess 120, in order to lessen excessive play in the thickness direction of the members 111 and 113. In a mating region A between the internal gear 104 and the gear portion 111a of the latch member 111, therefore, the gear 104 and the portion 111a engage each other for only half the gear thickness of the portion 111a. In other words, about half the thickness of each of the members 111 and 113 is a superfluous thickness, for which the reclining device becomes thicker and heavier in weight, and its material cost is higher.

In the conventional internal-gear reclining device 100, moreover, the pressed portions, such as the groove 110 and the recess 112 of the base plate 101, are large-sized and complicated in shape. Accordingly, the base plate 101 can be molded only by fine blanking, which requires use of more expensive dies than in normal pressing and entails higher costs. If the latch member 111 is too thick, on the other hand, there is a problem that the gear portion 111a, a small module, cannot be stamped out.

Further, load may be concentrated on the mating region A between the internal gear 104 and the latch member 111 when a torque Q (shown in FIG. 14) is applied to the region A in case of a vehicle crash or the like. In some cases, therefore, the mating region A may be lowered in strength.

If a force of inertia from the body of an occupant of the vehicle is applied to the seat back in case of a crash, an inward torsional load, as well as the aforesaid torque Q, is generated in the reclining device 100. This torsional load acts in the direction to separate the base plate 101 and the arm 105 from each other. When the plate 101 and the arm 105 are separated, the depth of engagement between the internal gear 104 and the latch member 111 is reduced, so that the strength of the mating region A is lowered inevitably.

Figure 16:
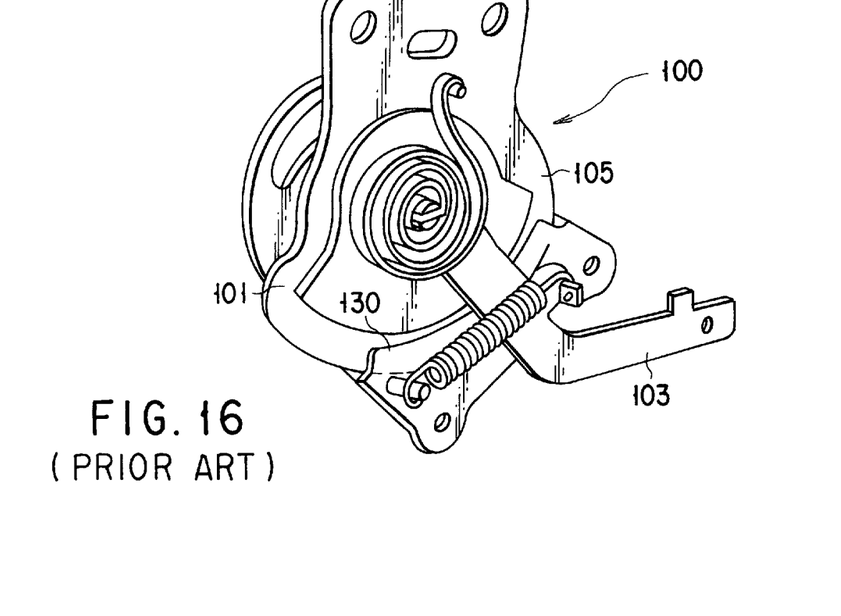
FIG. 16 is a perspective view of another conventional reclining device.

Conventionally, therefore, a bracket 130 is used to prevent the separation between the base plate 101 and the arm 105, as shown in FIG. 16. If this bracket 130 is additionally used in the reclining device 100, however, the weight of the device, as well as the number of its components, increases.

Figure 17:
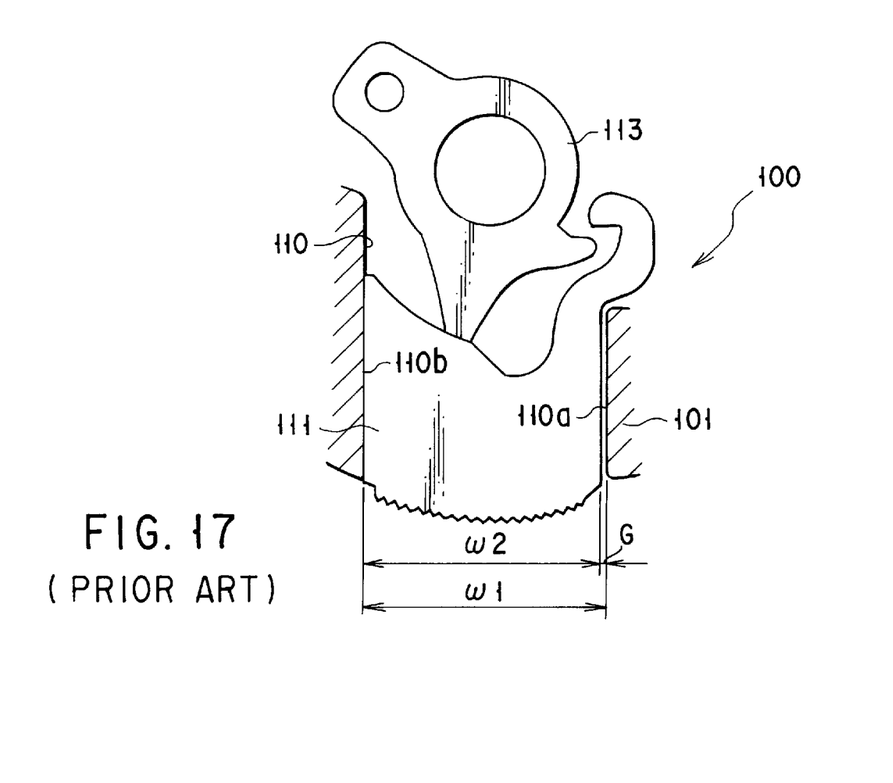
FIG. 17 is a front view showing a conventional guide projection, latch member, etc.

In the conventional reclining device 100 shown in FIG. 17, the groove 110 for holding the latch member 111 includes two parallel surfaces 110a and 110b for guiding the member 111 in sliding motion. In order to enable the member 111 to slide smoothly along the surfaces 110a and 110b, a clearance (gap) G must be defined by the member 111 and the surfaces 110a and 110b. This clearance G is equal to the difference between a width ω2 of the latch member 111 and a distance 107 1 between the two surfaces 110a and 110b. In consideration of the dimensional tolerances of the latch member 111 and the base plate 101 and the like, the clearance G should be made considerably large. It has been found, however, that this clearance G may cause excessive play between the plate 101 and the member 111 and make the seat back shaky.

BRIEF SUMMARY OF THE INVENTION

Accordingly, an object of the present invention is to provide an internal-gear reclining device, in which a latch member and a cam member can be thinned, a pressed portion of a base plate has a reduced size and a simple shape, and the strength of a mating portion between the latch member and an internal gear can be enhanced.

Another object of the invention is to provide a reclining device, in which a base plate and an arm can be prevented from separating from each other without increasing the weight or number of components of the device.

Still another object of the invention is to provide a reclining device, in which a latch member can smoothly slide without any excessive play between itself and a base plate.

In order to achieve the above object, a reclining device according to the present invention comprises:

a metallic base plate including a first guide projection and a second guide projection projecting in the thickness direction thereof, the guide projections being formed having opposite guide walls, individually;

a horizontal shaft provided on the base plate;

a metallic movable arm located adjacent to the base plate and including an offset portion rotatable around the shaft and recessed in the thickness direction thereof, the offset portion having an internal gear on an inner surface thereof and being adapted to receive the guide projections;

a latch member held between the inner surface of the offset portion and the base plate and movable along the guide walls between a locked position in which the latch member is in engagement with the internal gear and an unlocked position in which the latch member is disengaged from the internal gear;

a cam member held between the inner surface of the offset portion and the base plate and having a shape such as to be able to drive the latch member between the locked position and unlocked position; and an operating lever for rotating the cam member.

When this reclining device is in a locked state, the latch member is pressed against the internal gear of the movable arm by the cam member, and the arm is fixed to the base plate, that is, a seat back is fixed, with the internal gear in engagement with the latch member. When the operating lever is operated in its unlocking direction, the rotary force of the lever is transmitted to the cam member to rotate it, whereupon the latch member moves to be disengaged from the internal gear. Thus, the movable arm is allowed to rotate relatively to the base plate. The latch member is held between the first and second guide projections as it moves along the guide walls.

According to the reclining device of the present invention constructed in this manner, the latch member and the cam member can be reduced in thickness and therefore, in weight, so that the whole device can be made compact, and the material cost can be lessened. Since the latch member and the cam member can be thinner than conventional ones, moreover, an external gear and other small modules can be easily formed by fine blanking. Further, a pressed portion formed on the base plate includes only the first and second guide projections that are small and simple in shape. Accordingly, the base plate can be formed into a desired shape by normal pressing without requiring any high-cost work, such as fine blanking.

According to the invention, the respective thicknesses of the latch member and the cam member may be substantially equivalent to the offset of the offset portion of the movable arm, and these members may be housed inside the offset portion. In this arrangement, the external gear of the latch member in the offset portion can be caused effectively to engage the internal gear of the offset portion throughout the gear thickness, and a superfluous thickness can be eliminated from a mating region between the external and internal gears.

According to the invention, an auxiliary projection may be formed between the first and second guide projections and inserted in a hole formed in the latch member, in order to disperse load applied to the movable arm in case of a crash of a vehicle or the like to the base plate. This auxiliary projection should be arranged on a line connecting the end portions of the first and second guide projections. Further, it is more preferable that the auxiliary projection be designed to have a supporting face that extends in the same direction as the guide wall of the first guide projection and opposes the inside face of the hole formed in the latch member. This structure greatly increases the strength of the reclining device even against the load applied to the movable arm in a vehicle crash.

According to the invention, the guide projections and the auxiliary projection may be stamped out toward the offset portion of the movable arm and fitted entire in the offset portion of the movable arm. This arrangement is conducive to an additional reduction in thickness of the whole reclining device.

According to the invention, the guide projections may be provided individually with wide portions in order to be improved in strength. In this arrangement, the strength of the guide projections can be further improved against the load applied to the movable arm in case of a vehicle crash, and the strength of the mating region between the internal gear and the latch member can be enhanced.

The reclining device of the invention may be designed so that the base plate has a pin provided at the lower portion thereof, the pin passing near the internal gear of the movable arm, being inserted in a hole in the operating lever, and having a collar portion with a outward form larger than the hole, on that part thereof which projects outward from the hole. In this arrangement, the base plate and the movable arm can be restrained from separating from each other by means of the collar on the pin and the operating lever. A peg for anchoring a return spring for the lever may be used as the pin. In this case, there is no need of additional use of a bracket that is essential to the conventional reclining devices. Therefore, the number of components used in this device will not be increased, and an increase in weight is substantially negligible.

Moreover, the reclining device of the invention may be designed so that the latch member includes a first side face portion and a second side face portion extending substantially parallel to each other on either side thereof. In this case, the first guide projection facing the first side face portion is formed having the first guide wall inclined at an angle to the moving direction of the latch member, and the second guide projection facing the second side face portion is formed having the second guide wall extending along the moving direction of the latch member and a slanting wall continuous with the bottom of the second guide wall and inclined in the same direction as the first guide wall.

In the case where the slanting first guide wall is provided in this manner, the latch member is allowed to tilt at a certain degree, depending on the distance between the pair of guide projections and the width of the latch member. Also, the internal gear and the latch member can engage each other in a manner as the latch member is in contact with both the first and second guide projections. Even if there is any excessive play that is attributable to the dimensional tolerances of the base plate and the latch member, in this arrangement, a clearance between these two members in the locked state can be eliminated, so that the seat back can be prevented from vibrating.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will now be described with reference to the drawings of FIGS. 1 to 5.

Figure 1:
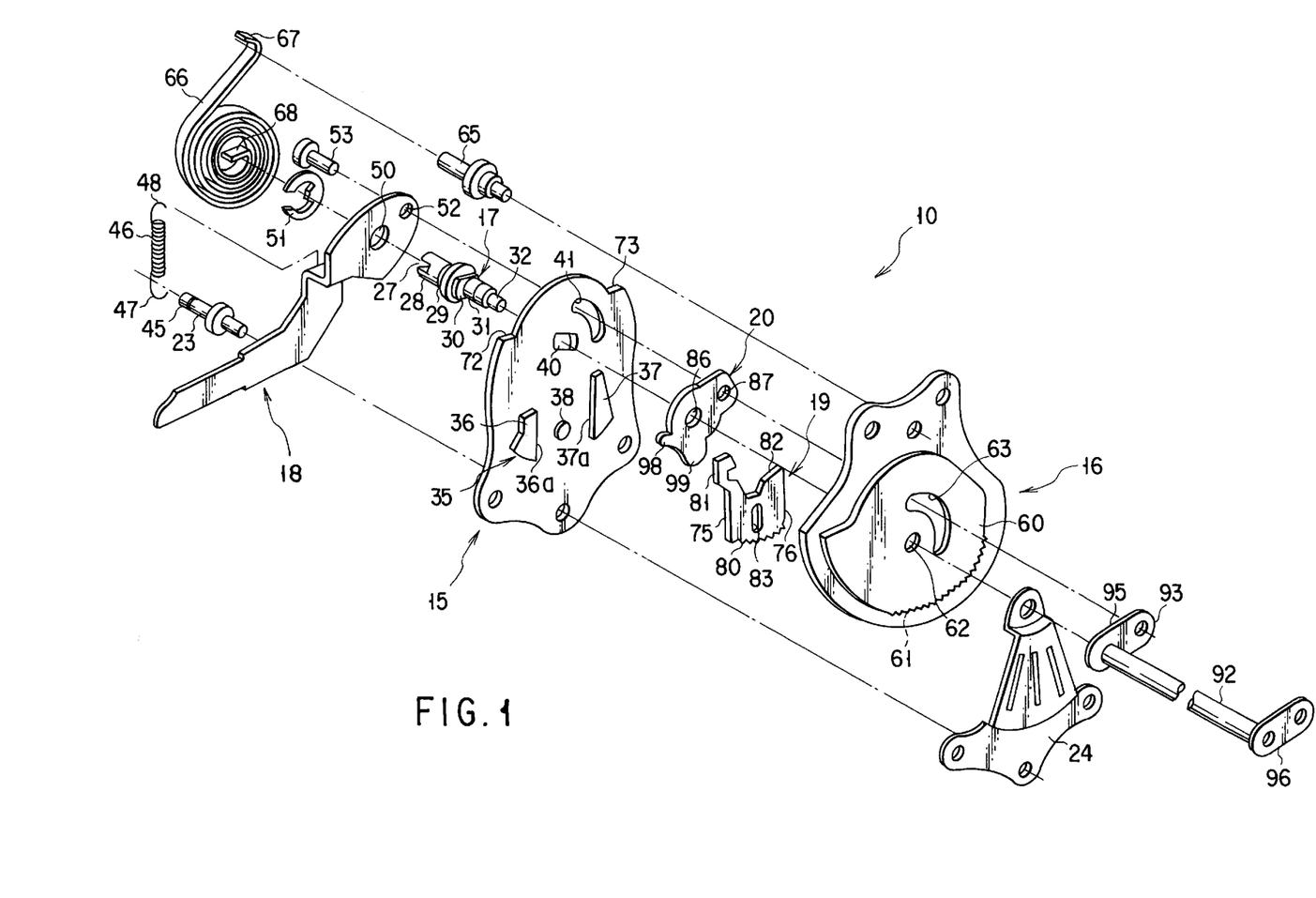
FIG. 1 is an exploded perspective view of a reclining device according to a first embodiment of the present invention.

A reclining device 10 shown in FIG. 1 comprises a base plate 15 fixed to a seat frame of a seat of a vehicle such as an automobile, a movable arm 16 fixed to a seat-back frame of the seat and located adjacent to the plate 15, and a shaft 17 fixed to the base plate 15. The device 10 further comprises an operating lever 18 rotatably supported by the shaft 17, a latch member 19, a cam member 20, etc. A sub-plate 24 is fixed to the base plate 15 by means of a pin 23 or the like so that the arm 16 is interposed between the plates 15 and 24.

The shaft 17 is composed of a columnar end portion 28 having slit 27, snap ring mounting groove 29, portion 30 having a noncircular cross section, columnar intermediate body portion 31, terminal portion 32, etc.

The base plate 15 has a pressed portion 35 that is pressed so as to be convex on the right-hand side of FIG. 1. Thus, that part of the pressed portion 35 which faces the movable arm 16 has a convex shape. The pressed portion 35 includes a pair of guide projections 36 and 37 having vertical rectilinear guide walls 36a and 37a, respectively, and a circular auxiliary projection 38 situated between the projections 36 and 37. This auxiliary projection 38 should be arranged, as shown in FIG. 4, on a line N connecting the end portions 36c and 37c of the first and second guide projections 36 and 37.

Figure 4:
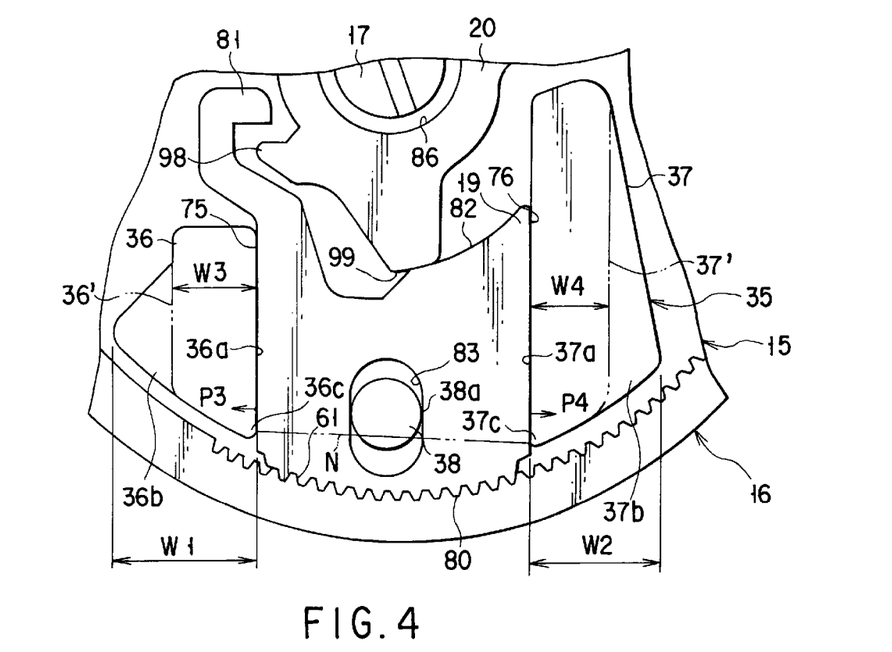
FIG. 4 is a partial front view showing the reclining device of FIG. 1 in a locked state.

As shown in FIG. 4, the first guide projection 36 has the shape of a fan that spreads downward. More specifically, a wide portion 36b with a width WI is provided on the lower end side of the first projection 36. The second guide projection 37 also has the shape of a fan that spreads downward. More specifically, a wide portion 37b with a width W2 is provided on the lower end side of the second projection 37. The guide projections 36 and 37 thus provided with the fan-shaped wide portions 36b and 37b, compared with vertically straight guide projections 36' and 37' (with widths W3 and W4), are considerably improved in strength to stand load (load in the directions indicated by arrows P3 and P4 in FIG. 4) that acts on a latch member 19 in case of a crash of the vehicle.

A noncircular shaft mounting hole 40 is formed in the upper portion of the base plate 15. A noncircular portion 30 of the shaft 17 is fixedly fitted in the hole 40. An arcuate slot 41 is formed centering around the mounting hole 40.

A spring retaining portion 45 is provided on an end portion of the pin 23, and one end 47 of a tension spring 46 is anchored to the retaining portion 45. The other end 48 of the spring 46 is anchored to the operating lever 18 so that the lever 18 is urged toward a locked position shown in FIG. 2 by means of the elastic force of the spring 46. Thus, the spring 46 functions as a return spring for the lever 18.

The operating lever 18 is rotatable around the shaft 17. More specifically, a circular hole 50 is formed in the proximal portion of the lever 18. The lever 18 is prevented from coming off the shaft 17 by fitting a snap ring 51, such as an E-ring, in the snap ring mounting groove 29 with the end portion 28 of the shaft 17 in the hole 50. A coupling pin 53 is passed through a hole 52 in the proximal portion of the lever 18. The pin 53 can be inserted into the arcuate slot 41 of the base plate 15.

The movable arm 16 is provided with an offset portion 60. The portion 60 is stamped out so as to be convex on the right-hand side of FIG. 1 by fine blanking. Thus, the offset portion 60 has a concave surface that faces the base plate 15. An internal gear 61 is formed on the lower end of the offset portion 60. The gear 61 is formed along a circular arc around a bearing hole 62. The hole 62 has a circular shape such that the intermediate body portion 31 of the shaft 17 can be rotatably inserted into the hole 62. An arcuate slot 63 is formed centering around the bearing hole 62.

Attached to the upper portion of the movable arm 16 is a retaining member 65 that doubles as a spring peg. An outer end 67 of a spiral spring 66 is anchored to the member 65. An inner end 68 of the spring 66 is fitted in a slit 27 of the shaft 17 so that the arm 16 is urged in the counterclockwise direction of FIG. 2 (in which the seat back is raised) by means of the repulsive load of the spring 66.

The retaining member 65 also serves to abut against a first stopper wall 72 of the base plate 15 when the movable arm 16 rotates forward through a given angle or to abut against a second stopper wall 73 when the arm 16 falls backward through a given angle, thereby regulating the range of rocking motion of the arm 16.

The latch member 19, cam member 20, and guide projections 36 and 37 are interposed between the base plate 15 and the movable arm 16, that is, housed in a space portion inside the offset portion 60 of the arm 16. The thickness of each of the members 19 and 20 is substantially equal to the gear thickness of the internal gear 61 of the movable arm 16, that is, an offset S (shown in FIG. 3) of the offset portion 60. Both the latch member 19 and the cam member 20 are formed by fine blanking.

The latch member 19 includes side face portions 75 and 76 arranged in substantially parallel straight lines that extend along the guide walls 36a and 37a, respectively. Thus, the latch member 19 can vertically move along the walls 36a and 37a of the guide projections 36 and 37. An external gear 80 that can engage the internal gear 61 is provided on the lower portion of the latch member 19. The external gear 81 is in mesh with the internal gear 61 across its thickness. A hook portion 81 and a slanting cam receiving surface 82 are provided on the upper side of the latch member 19.

A vertical slot 83 is formed in the latch member 19. The auxiliary projection 38 of the base plate 15 is inserted in the slot 83. As shown in FIG. 4, the projection 38 is formed in a position such that one side face 38a thereof, that is, the side on which load acts in case of a crash of the vehicle, can contact with the inner surface of the slot 83. Because of the arrangement of the auxiliary projection 38 on a line N connecting the end portions 36c and 37c of the first and second guide projections 36 and 37, the load P3 is supported by both the guide wall 36a and the side face 38a of the auxiliary projection 38. The guide projection 36 is thereby prevented from being distorted under the load P3, which causes the base plate 15 to exert a great strength against this load.

A through hole 86 is provided in the central portion of the cam member 20. The intermediate body portion 31 of the shaft 17 is inserted in the hole 86. A coupling pin 53 is inserted in a hole 87 that is formed in the end portion of the cam member 20. The pin 53 projects to the outside of the movable arm 16 through the arcuate slot 63 therein. A terminal part 93 of a coupling rod 92 can be connected the distal end portion of the pin 53. One end 95 of the rod 92 is rotatably supported by the terminal portion 32 of the shaft 17.

Figure 2:
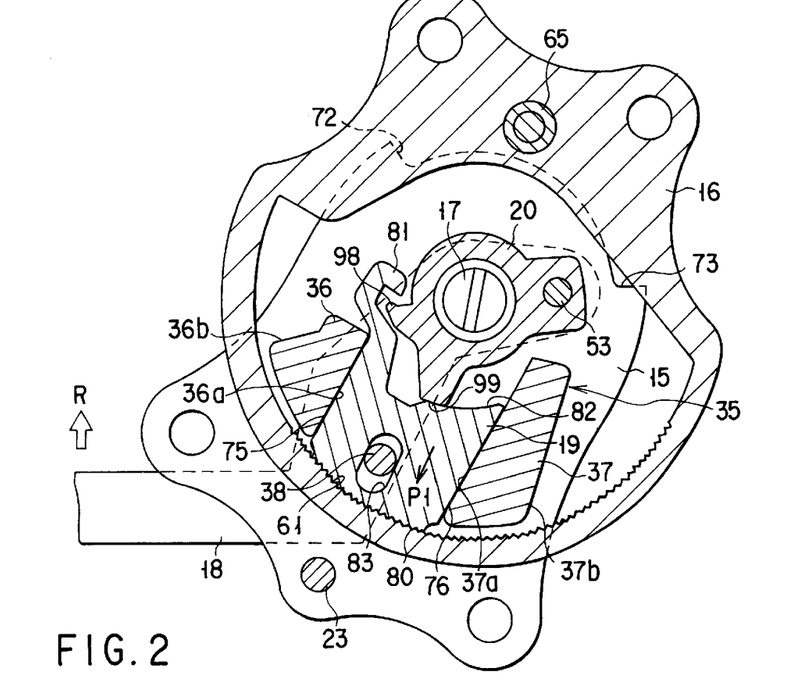
FIG. 2 is a front view, partially in section, showing the reclining device of FIG. 1.
Figure 3:
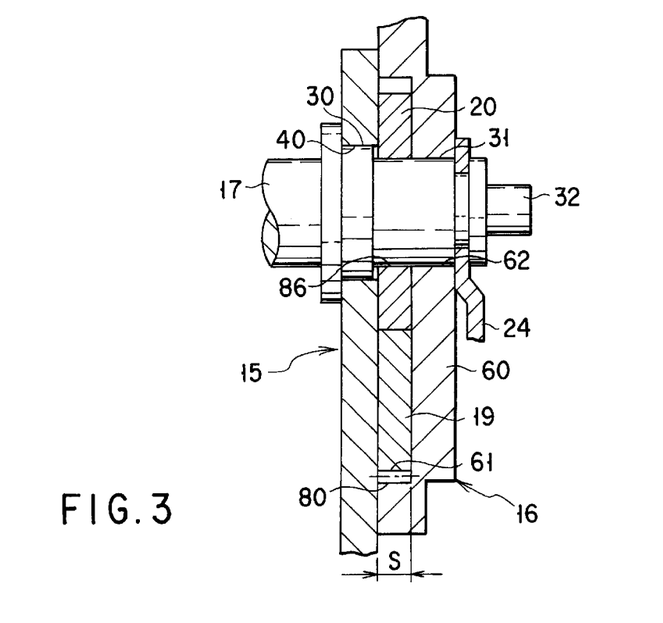
FIG. 3 is a partial vertical sectional view of the reclining device of FIG. 1.
Figure 5:
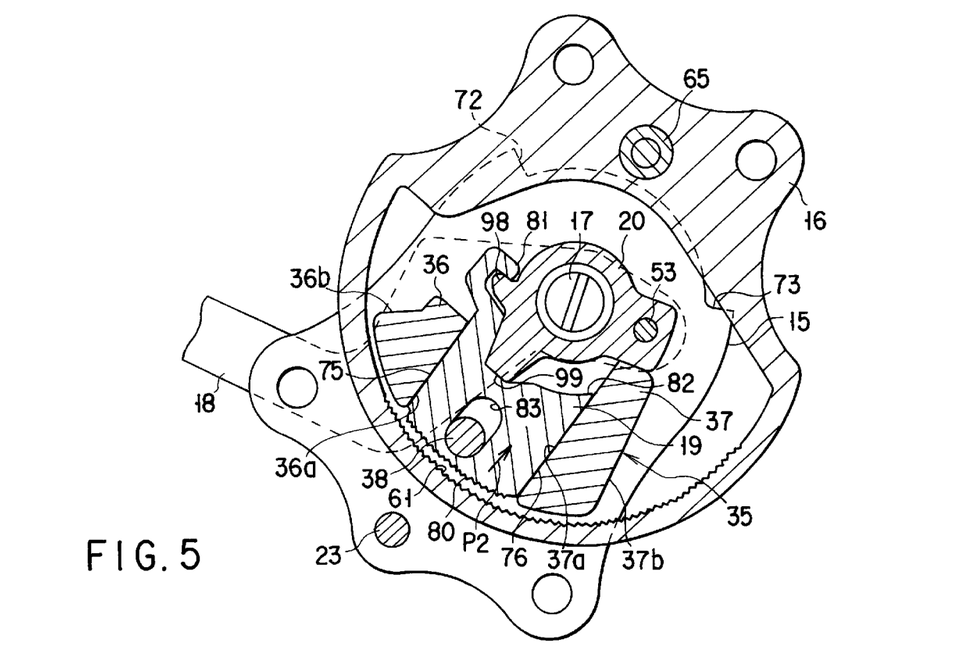
FIG. 5 is a front view, partially in section, showing the reclining device of FIG. 1 in an unlocked state.

As shown in FIGS. 2 and 5 and other drawings, the cam member 20 is provided with a retaining portion 98, having a shape such that it can be caught by the hook portion 81 of the latch member 19, and a cam surface 99 shaped so as to be able to contact with the cam receiving surface 82. When the cam member 20 is in a locked position shown in FIG. 2, the cam member 20 pushes the latch member 19 in the direction of arrow P1 while being in contact with the surface 82 of the member 19, thereby pressing the external gear 80 against the internal gear 61.

The retaining portion 98 of cam member 20 has a shape such that it can pull up the latch member 19 in the direction of arrow P2 when the cam member 20 is rotated to an unlocked position shown in FIG. 5 or is rotated clockwise with the hook portion 81 of the latch member 19 caught thereby.

The following is a description of the operation of the reclining device 10 constructed in this manner.

In the locked state shown in FIG. 2, the latch member 19 is pressed toward the internal gear 61 by the cam member 20. The movable arm 16 is fixed to the base plate 15 with the internal and external gears 61 and 80 in engagement with each other. In this state, the seat back is fixed.

When the operating lever 18 is manually moved upward (in the direction indicated by arrow R in FIG. 2), a force (torque) applied to applied to the lever 18 is transmitted to the cam member 20 through the coupling pin 53, and the retaining portion 98 of the cam member 20 moves in the direction to pull up the hook portion 81 of the latch member 19. As shown in FIG. 5, therefore, the latch member 19 moves in the direction of arrow P2, whereupon the internal and external gears 61 and 80 are disengaged from each other. Consequently, the movable arm 16 is released from the constraint by the latch member 19, so that it is allowed to rotate relatively to base plate 15 around the shaft 17.

The above-described reclining device 10 is provided on one side of the seat. In the case of a bilateral-locking recliner, a second reclining device (not shown) that resembles the device 10 in construction is located on the other side of the seat. The respective cam members 20 (only one of which is shown) of these two reclining devices 10 are linked together by means of the coupling rod 92. Thus, the other end 96 of the rod 92 is connected to the second reclining device. In this case, a torque generated when the operating lever 18 is operated in the releasing direction is transmitted to the cam member (not shown) of the second reclining device by means of the coupling rod 92, as well as to the cam member 20 of the first reclining device 10. Thereupon, the latch member of the second reclining device is disengaged from the internal gear.

After the tilt angle of the seat back is adjusted in the aforesaid unlocked state, the operating lever 18 is released from the operating force. Thereupon, the lever 18 is returned to the position shown in FIG. 2 by means of the elastic force of the tension spring 46. As the cam member 20 then returns to the locked position in association with the lever 18, the external gear 80 of the latch member 19 engages the internal gear 61 of the movable arm 16, so that the arm 16 is fixed.

Figure 6A:
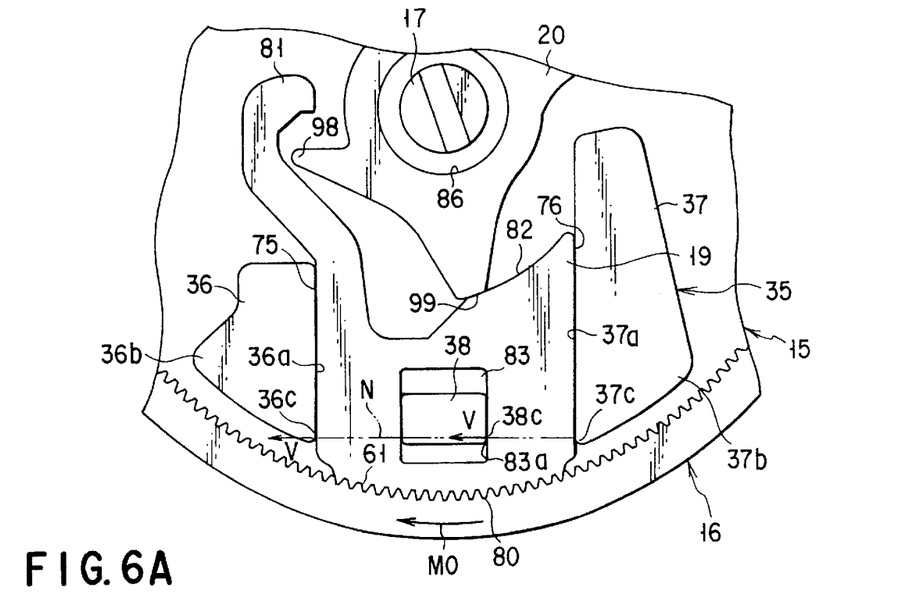
FIG. 6A is a partial front view showing a reclining device according to a second embodiment of the invention.

There now follows an explanation of the second embodiment of the invention illustrated in FIG. 6A. The components shared with the aforementioned first embodiment are numbered with the same reference numerals, and will not be described for simplicity. Since the elemental structure and function of this embodiment are similar to those of the first embodiment, the explanation will cover only the portions of the invention different from the first embodiment.

In this embodiment, the auxiliary projection 38 has a supporting face 38c that extends substantially straight in a direction along the guide walls 36a and 37a. This supporting face 38c opposes the inner face 83a of the hole 83, which also extends substantially straight. The faces 38c and 83a are both arranged in positions to cross a line N connecting the end portions 36c and 37c of the guide projections 36 and 37. Both the auxiliary projection 38 and the hole 83 have rectangular shapes when viewed in a sideways direction of the base plate 15. A moment M0 that is produced on the movable arm 16 in a car crash, for instance, will be applied as a load V to the end portion 36c of the guide projection 36 provided on the base plate 15, via the external gear 80. This embodiment designs the supporting face 38c of the auxiliary projection 38 to cross the line N which extends in a direction of the load V being applied, which means that the load V is supported by both the guide projection 36 and the supporting face 38c of the auxiliary projection 38. Such an arrangement prevents the guide projection 36 from being distorted under the load V, thereby causing the base plate 15 to exert a great strength against the load V.

Figure 6B:
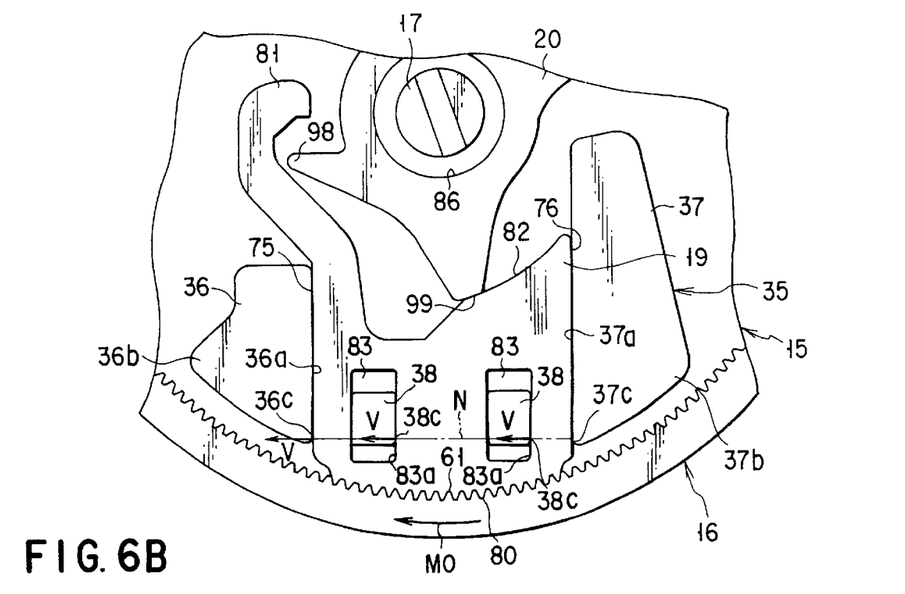
FIG. 6B is a partial front view showing a reclining device according to a third embodiment of the invention.

Plural projections 38 may be formed on the base plate 15. FIG. 6B shows a third embodiment of the present invention. In this embodiment, a pair of auxiliary projections 38 are formed on the base plate 15. Each projection 38 is inserted in the corresponding hole 83.

Figure 7:
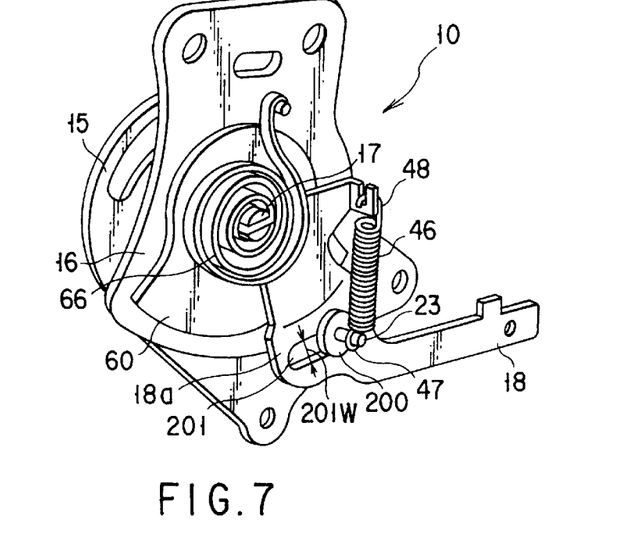
FIG. 7 is a perspective view of a reclining device according to a fourth embodiment of the invention.
Figure 8:
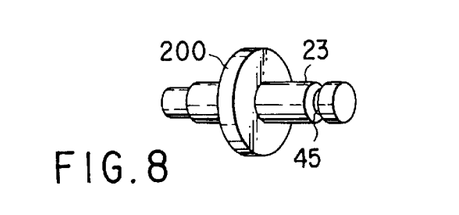
FIG. 8 is a perspective view of a pin used in the reclining device of FIG. 7.
Figure 9:
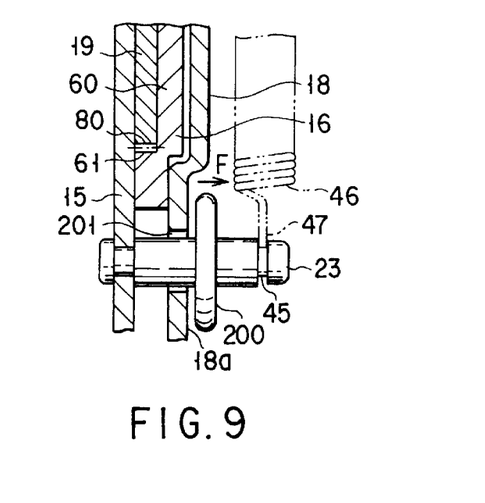
FIG. 9 is a partial vertical sectional view of the reclining device of FIG. 7.

Referring now to FIGS. 7, 8 and 9, a fourth embodiment of the present invention will be described. Since the construction and function of the fourth embodiment are basically the same as those of the first embodiment, like reference numerals are used to designate common portions throughout the views, and only differences between the two embodiments will be described below.

As shown in FIG. 7, a collar portion 200 is formed on a pin 23 on the lower portion of a base plate 15. As described before in connection with the first embodiment, the pin 23 supports one end 47 of a spring 46, and passes near an internal gear 61 of a movable arm 16. A wide portion 18a of an operating lever 18 is formed having a through hole 201 through which the pin 23 is passed. The hole 201 is designed as a slot having the shape of a circular arc around a shaft 17 lest it prevent the lever 18 from moving.

As shown in FIG. 8, the large-sized collar portion 200 is formed integrally with the pin 23. The portion 200 is located corresponding to an intermediate portion of the pin 23 in the axial direction thereof, that is, in a position where the pin 23 projects outward from the slot 201. The collar portion 200 has an outward form greater than a width 201w of the slot 201. As shown in FIG. 9, moreover, the movable arm 16 is situated between the operating lever 18 and the base plate 15.

The movable arm 16 comes into contact with the operating lever 18 when it is urged to separate (in the direction of arrow F in FIG. 9) from the base plate 15 by a torsional load that is generated in case of a crash. In this case, the lever 18 is restrained from moving in the direction of arrow F by the collar portion 200 of the pin 23. In consequence, the movable arm 16 can avoid separating from the base plate 15, and the strength of engagement between the internal gear 61 and the external gear 80 can be secured. Since the pin 23 is located near the position for the engagement between the internal and external gears 61 and 80, it is a very effective means for restraining the separation of the movable arm 16.

Figure 10:
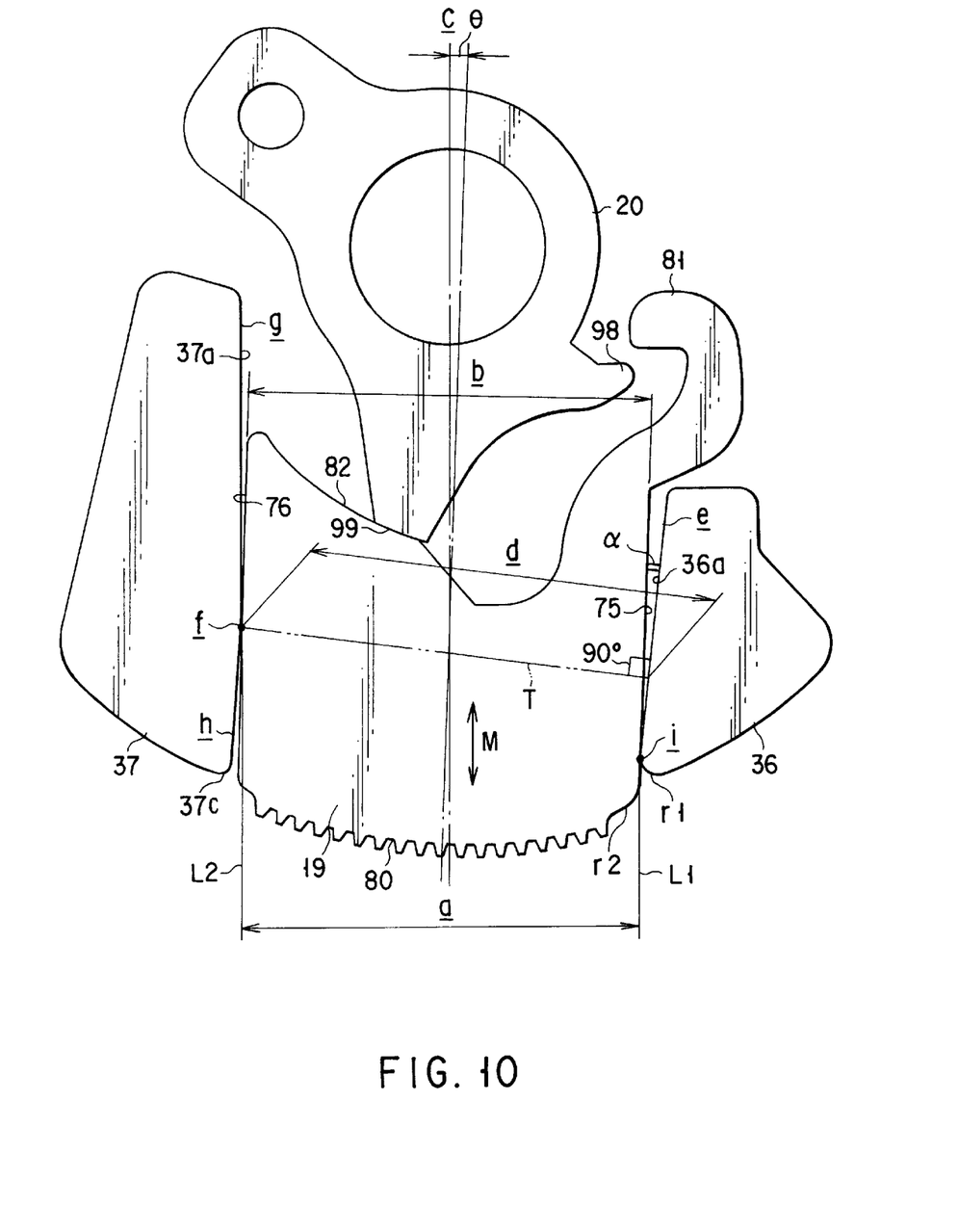
FIG. 10 is a front view showing a latch member and the like of a reclining device according to a fifth embodiment of the invention.

Referring now to FIG. 10, a fifth embodiment of the present invention will be described. Since the construction and function of the fifth embodiment are basically the same as those of the first embodiment, like reference numerals are used to designate common portions throughout the views, and only differences between the two embodiments will be described below.

In FIG. 10, a latch member 19 includes first and second side face portions 75 and 76 arranged substantially parallel to each other on either side thereof. A first guide projection 36 that faces the first side face portion 75 is formed having a first guide wall 36a, which is inclined at an angle to the moving direction (vertical direction indicated by arrow M in FIG. 10) of the latch member 19. More specifically, the first guide wall 36a is in the form of a slope that is inclined in the longitudinal direction with respect to the first side face portion 75 so that its lower part projects ahead of its lower part. A circular arc r1 is formed at the lower end portion of the guide wall 36a.

A second guide projection 37 that faces the second side face portion 76 is formed having a second guide wall 37a, which extends straight along the moving direction M of the latch member 19, and a slanting wall 37c that is continuous with the bottom of the wall 37a and is inclined in the same direction as the first guide wall 36a.

A distance a between the first and second guide projections 36 and 37 is equal to a horizontal dimension between a segment L1, which passes through an end of the circular arc r1 at the lower end portion of the first guide wall 36a and extends parallel to a center line C, and an extension of L2 of a segment g that extends along the second guide wall 37a. This distance a is shorter than a width b (latch width) of the latch member 19. Symbol e designates a segment that extends along the first guide wall 36a. An intersecting point f exists in a position where a segment h along the slanting wall 37c and the segment g intersect each other. A substantial minimum distance d between the pair of guide projections 36 and 37 is equal to the length of a line T perpendicular to the segment e that passes through the intersecting point f.

If the minimum distance d between the guide projections 36 and 37 is longer than the latch width b, in this case, the latch member 19 can tilt in the longitudinal direction around the intersecting point f. The respective tilt angles of the segments e and h to the latch member moving direction M are wider than a tilt angle θ of the latch member 19.

Figure 11A:
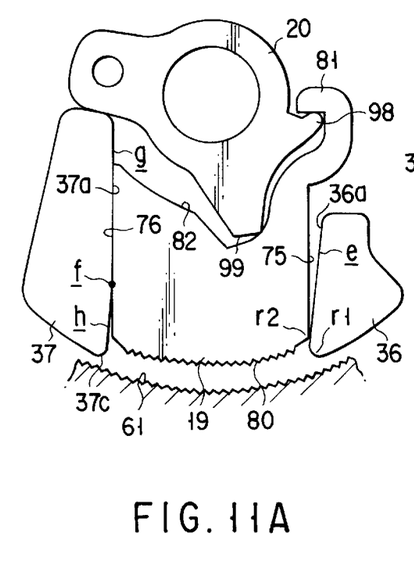
FIG. 11A is a front view showing the latch member and the like in a state such that a clearance between the latch member and guide projections is the largest.
Figure 11B:
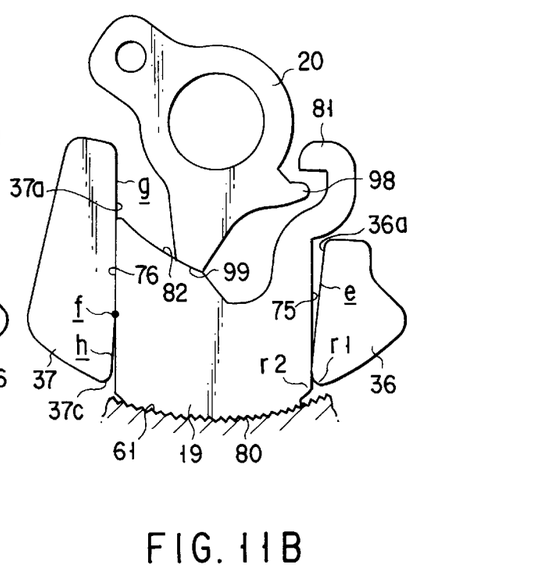
FIG. 11B is a front view showing an operation mode of the latch member in the reclining device shown in FIG. 11A.

FIGS. 11A and 11B both show a case where the distance a between the first and second guide projections 36 and 37 is set with a maximum tolerance and the latch width b with a minimum tolerance, that is, where a clearance between the projections 36 and 37 and the latch member 19 is the largest. On the other hand, FIGS. 12A and 12B show a case where the distance between the guide projections 36 and 37 is set with a minimum tolerance and the latch width b with a maximum tolerance, that is, where the clearance is the smallest.

As the latch member 19 moves from the unlocked position shown in FIG. 11A to the locked position shown in FIG. 11B with the largest clearance, it descends along the second guide wall 37a (segment g). The movable arm 16 is locked when the internal and external gears 61 and 80 engage each other with the member 19 in contact with the second guide wall 37a and the arcuate surface r1.

Figure 12A:
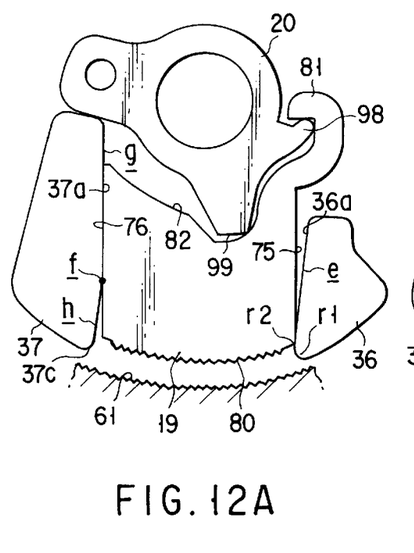
FIG. 12A is a front view showing the latch member and the like in a state such that a clearance between the latch member and guide projections is the smallest.
Figure 12B:
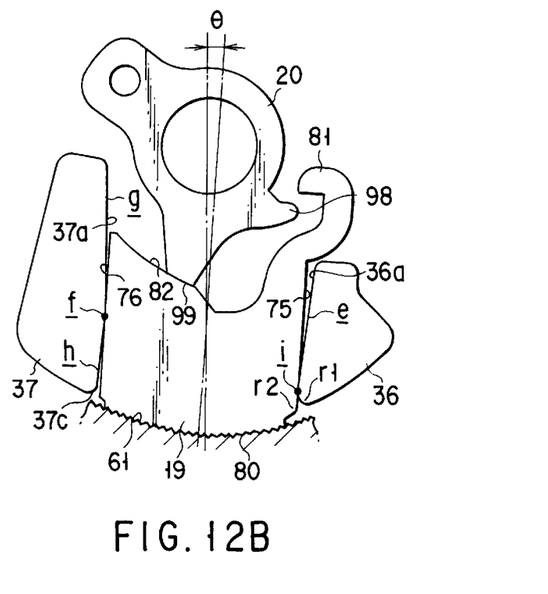
FIG. 12B is a front view showing an operation mode of the latch member in the reclining device shown in FIG. 12A.

As the latch member 19 moves from the unlocked position shown in FIG. 12A to the locked position shown in FIG. 12B with the smallest clearance, it first descends along the second guide wall 37a (segment g). Thereafter, an arcuate surface r2 at the lower end of the first side face portion 75 of the member 19 meets the first guide wall 36a (segment e). In this case, the latch member 19 further moves downward while inclining around the intersecting point f in a direction such that an angle a (shown in FIG. 10) between the first guide wall 36a and the member 19 narrows. The latch member 19 is locked when the internal and external gears 61 and 80 engage each other with the member 19 in contact with both a point i on the arcuate surface r1 at the lower end of the first guide wall 36a and the intersecting point f.

Thus, the latch member 19 can always be supported at two points by means of the guide projections 36 and 37 without regard to the size of the clearance, maximum or minimum. In consequence, formation of the clearance between the projections 36 and 37 and the latch member 19, which may possibly cause excessive play, can be avoided during the locking operation.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reclining device comprising:

a metallic base plate including a first guide projection and a second guide projection projecting in a thickness direction of said base plate, the guide projections being formed having opposite guide walls, individually;

a horizontal shaft provided on the base plate;

a metallic movable arm located adjacent to the base plate and including an offset portion rotatable around the shaft and recessed in the thickness direction of said base plate, the offset portion having an internal gear on an inner surface receiving the guide projections;

a latch member held between the inner surface of the offset portion and the base plate and movable along the guide walls between a locked position in which the latch member is in engagement with the internal gear and an unlocked position in which the latch member is disengaged from the internal gear;

a cam member held between the inner surface of the offset portion and the base plate and having a shape such as to be able to drive the latch member between the locked position and the unlocked position; and an operating lever attached to said shaft and for rotating the cam member, wherein said latch member includes a first side face portion and a second side face portion extending substantially parallel to each other on opposite sides thereof, said first guide projection facing a first side face portion is formed having a first of said guide walls inclined relative to a longitudinal direction parallel to the first side face portion, and said second guide projection facing a second side face portion is formed having a second of said guide walls extending generally along a moving or said longitudinal direction of the latch member and having a first extent and a slanting second extent continuous with an end of the second guide wall, said second extent being inclined in the same direction as the first guide wall.

* * * * *